United States Patent
Dubois et al.

(10) Patent No.: US 12,268,985 B2
(45) Date of Patent: Apr. 8, 2025

(54) PROCESS FOR TREATING A GASEOUS EFFLUENT FROM PYROLYTIC DECOMPOSITION OF A POLYMER

(71) Applicants: ARKEMA FRANCE, Colombes (FR); PYROVAC, Quebec (CA)

(72) Inventors: Jean-Luc Dubois, Colombes (FR); Bruno De Caumia, Stoneham-et-Tewkesbury (CA); Daniel Blanchette, Levis (CA); Christian Roy, Quebec (CA)

(73) Assignees: ARKEMA FRANCE, Colombes (FR); PYROVAC, Quebec (CA)

( * ) Notice: Subject to any disclaimer, the term of this patent is extended or adjusted under 35 U.S.C. 154(b) by 844 days.

(21) Appl. No.: 17/286,168

(22) PCT Filed: Oct. 18, 2019

(86) PCT No.: PCT/FR2019/052479
§ 371 (c)(1),
(2) Date: Apr. 16, 2021

(87) PCT Pub. No.: WO2020/079380
PCT Pub. Date: Apr. 23, 2020

(65) Prior Publication Data
US 2021/0387135 A1 Dec. 16, 2021

(30) Foreign Application Priority Data
Oct. 18, 2018 (FR) ........................... 1859659

(51) Int. Cl.
*B01D 53/14* (2006.01)
*B01D 53/72* (2006.01)
*C10B 53/07* (2006.01)

(52) U.S. Cl.
CPC ..... *B01D 53/1418* (2013.01); *B01D 53/1412* (2013.01); *B01D 53/1431* (2013.01);
(Continued)

(58) Field of Classification Search
CPC ............ B01D 53/1418; B01D 53/1412; B01D 53/1431; B01D 53/1487; B01D 53/1493;
(Continued)

(56) References Cited

U.S. PATENT DOCUMENTS 2,165,631 A * 7/1939 Gerhold ................. C10G 11/00
208/101
2,535,606 A * 12/1950 Smith ....................... C09F 5/00
585/365
(Continued)

FOREIGN PATENT DOCUMENTS

BE 855986 A * 10/1977 ............. C10B 49/20
CN 106190213 A * 12/2016
(Continued)

OTHER PUBLICATIONS

Abdullah, N.A. et al., "A Review of Improvements to the Liquid Collection System Used in the Pyrolysis Process for Producing Liquid Smoke", International Journal of Technology, vol. 8, No. 7, p. 1197-1206, Dec. 26, 2017. XP055665542.
(Continued)

*Primary Examiner* — Stephen Hobson
(74) *Attorney, Agent, or Firm* — Buchanan Ingersoll & Rooney PC (57) ABSTRACT

A process for treating a gaseous effluent obtained from a pyrolytic decomposition of one or more polymers, including: a condensation step, in a condensation chamber maintained at a first pressure, of a gaseous effluent placed in contact with an absorbent liquid, the temperature of the absorbent liquid being below the temperature of the gaseous
(Continued)

effluent, a step of partial vaporization, by expansion of the condensate in a chamber maintained at a second pressure below the first pressure, a reinjection step which includes at least partly redirecting a first liquid or vapor fraction, obtained on conclusion of the partial vaporization step, to the condensation chamber, and a recovery step including purification of a second liquid or vapor fraction, obtained on conclusion of the partial vaporization step and charged with monomer(s).

23 Claims, 2 Drawing Sheets

(52) U.S. Cl.
CPC ..... *B01D 53/1487* (2013.01); *B01D 53/1493* (2013.01); *B01D 53/72* (2013.01); *B01D 2252/2021* (2013.01); *B01D 2252/205* (2013.01); *C10B 53/07* (2013.01)

(58) Field of Classification Search
CPC ............ B01D 53/72; B01D 2252/2021; B01D 2252/205; B01D 2252/202; B01D 2256/24; B01D 2257/702; B01D 53/1425; C10B 53/07
See application file for complete search history.

(56) References Cited

U.S. PATENT DOCUMENTS

| | | | | |
|---|---|---|---|---|
| 2,827,444 A * | 3/1958 | Cines | ................ | C08F 10/00 585/254 |
| 3,233,005 A * | 2/1966 | Shannahan | ............ | C07C 11/24 585/867 |
| 3,970,524 A * | 7/1976 | Funk | ................ | B01D 53/005 201/37 |
| 4,105,502 A * | 8/1978 | Choi | ................ | C10G 1/02 201/22 |
| 4,206,186 A * | 6/1980 | Holter | ................ | C10K 1/20 423/239.1 |
| 4,303,477 A * | 12/1981 | Schmidt | ............ | C10B 53/07 201/20 |
| 4,344,373 A * | 8/1982 | Ishii | ................ | C10B 53/00 48/209 |
| 4,364,796 A * | 12/1982 | Ishii | ................ | C10B 53/00 201/31 |
| 4,746,406 A * | 5/1988 | Timmann | ............ | C10B 47/24 201/31 |
| 5,213,587 A * | 5/1993 | Ekstrom | ............ | C10K 1/02 48/209 |
| 5,451,297 A * | 9/1995 | Roy | ................ | C22B 1/005 201/35 |
| 5,824,122 A * | 10/1998 | Baumgartel | ............ | C10K 1/06 48/128 |
| 6,018,090 A * | 1/2000 | Schmidt | ............ | F23G 5/0273 423/239.1 |
| 6,143,856 A * | 11/2000 | Roy | ................ | C07C 37/72 203/40 |
| 6,210,583 B1 * | 4/2001 | Kurukchi | ............ | C02F 9/00 203/79 |
| 7,803,845 B2 * | 9/2010 | Boerrigter | ............ | C10K 1/18 518/726 |
| 8,936,654 B2 * | 1/2015 | Platon | ................ | C10C 5/00 585/242 |
| 9,534,174 B2 * | 1/2017 | Mazanec | ............ | C10G 1/086 |
| 9,790,179 B2 * | 10/2017 | Tanzio | ................ | C07C 209/86 |
| 2003/0028052 A1 * | 2/2003 | Hirao | ................ | C07C 51/48 562/600 |
| 2009/0188649 A1 * | 7/2009 | Nakamura | ............ | C10B 53/00 165/104.19 |
| 2012/0167452 A1 * | 7/2012 | Platon | ................ | B01D 53/1487 252/364 |
| 2013/0172637 A1 * | 7/2013 | Sellars | ................ | C10G 3/42 585/240 |
| 2016/0045841 A1 * | 2/2016 | Kaplan | ................ | C01B 32/05 429/49 |
| 2016/0115120 A1 * | 4/2016 | Dubois | ................ | C07C 253/30 560/177 |
| 2016/0122190 A1 * | 5/2016 | Schmelzer | ............ | C10K 1/005 423/418.2 |
| 2016/0122654 A1 * | 5/2016 | Barczyk | ................ | C10B 53/07 201/4 |
| 2016/0145185 A1 * | 5/2016 | Baek | ................ | B01D 53/1418 202/169 |
| 2017/0121608 A1 * | 5/2017 | Handerek | ............ | C10B 47/20 |
| 2017/0190976 A1 * | 7/2017 | Brandhorst, Jr. | ....... | C10L 5/447 |
| 2017/0336070 A1 * | 11/2017 | Inskip | ................ | F27D 17/008 |
| 2024/0093099 A1 * | 3/2024 | Zhang | ................ | C10G 21/20 |

FOREIGN PATENT DOCUMENTS

| | | | | |
|---|---|---|---|---|
| EP | 0009545 A1 | 4/1980 | | |
| EP | 2502895 A1 | 9/2012 | | |
| FR | 2914641 A1 * | 10/2008 | ........... | C07C 227/04 |
| WO | WO-2013187788 A2 * | 12/2013 | ............. | C10B 53/07 |
| WO | WO-2014040634 A1 * | 3/2014 | ............. | C08J 11/12 |
| WO | 2017179009 A1 | 10/2017 | | |

OTHER PUBLICATIONS

Firdaus, M.A. et al., "Practical Engineering Guidelines for Processing Plant Solutions Ethylene Quench Water Tower (Engineering Design Guideline)", pp. 1-30, Jun. 2014. Retrieved from the Internet: http://kolmetz.com/pdf/EGD2/ENGINEERING_DESIGN_GUIDELINES_ethylene_quench_water_tower_rev web.pdf, XP055665576.

Gulf, P., "Hydrocarbon Processing Petrochemical Processes 2010", pp. 1-8, Dec. 31, 2010. Retrieved from the Internet: http://libros.organicala.org/OPS1/petroquimica/Procesos_petroquimicos10b.pdf, XP055607815.

Poe, W. A. et al., "Gas Enrichment Process and Gas Dehydration Unit", Modelling, Control, and Optimzation of Natural Gas Processing Plants, Elsevier, pp. 24-30, Dec. 31, 2017, XP055607810.

International Search Report (PCT/ISA/210) and Written Opinion (PCT/ISA/237) mailed on Feb. 20, 2020, by the European Patent Office as the International Searching Authority for International Application No. PCT/FR2019/052479.

* cited by examiner

PROCESS FOR TREATING A GASEOUS EFFLUENT FROM PYROLYTIC DECOMPOSITION OF A POLYMER

FIELD OF THE INVENTION

The present invention relates to the field of treating gaseous effluents obtained from the decomposition of polymer(s).

More particularly, the invention relates to a process for treating a gas obtained from a pyrolytic decomposition of a polymer or of a polymer blend. This process finds its application in the recycling of plastics and plastic residues generally comprising several polymers of different grades and in particular in the recycling of polymer compounds comprising only one family of polymers.

PRIOR ART

In 2017, hundreds of millions of metric tons of plastics were produced worldwide. As such, the production and recycling of plastics are clearly seen as major challenges from an environmental and economic standpoint. It is thus advantageous from an economic and environmental standpoint to be able to depolymerize and/or crack the polymer resin and to obtain products that can be reused. Among the conventional methods for recycling plastics, thermal pyrolysis and mechanical recycling are the ones most often employed.

Thermal pyrolysis involves placing the plastic item for treatment in a suitable chamber and then heating the chamber so that the heat is transferred to the item. It allows the treatment of plastic waste, and results generally in sooty residues, oil and gases, which cannot be reused as such in the production of thermoplastic polymer matrix. Such thermal decomposition processes are notably used for decomposing PMMA (polymethyl methacrylate), polystyrene or other plastic residues. In the case of the thermal decomposition of PMMA or of polystyrene, it would be advantageous to be able to recover the monomers. In the case of the thermal decomposition of plastic residues, it is possible to recover a mixture of products, usable as combustible or fuel. The core fraction of polyolefin pyrolysis is, for example, rich in a cut of naphtha type (pyrolysis gasoline), which may advantageously be used to feed a vapor cracking unit (conventional unit of petrochemistry) so as once again to produce olefins. In general, the gaseous effluents obtained from this thermal decomposition by polymer pyrolysis are rich in compound(s) that it is desired to recover and recycle.

To isolate and recover the compounds (e.g. the monomer(s)), the gaseous effluent must be condensed. To do this, use is conventionally made of a heat exchanger in which the gaseous effluent circulates, so that the heat exchanger cools the gaseous effluent until a liquid fraction is produced.

The product recovered on conclusion of this condensation is of relatively mediocre quality and requires subsequent steps of washing and then of purification by distillation.

The gaseous effluent obtained from the thermal decomposition of the polymer(s) is composed of light, medium and heavy mole fractions. The monomer(s) that it is desired to recover and upgrade are essentially present in the medium mole fraction. The Applicant thus sought a solution for more efficiently isolating this mole fraction of interest.

WO 2017/179009 describes a process and a system for separating C3 hydrocarbons from a gaseous mixture. The separation of the components in this system is done according to their boiling point, and the process and the system thus correspond to a distillation column.

US 2016/145185 describes a process for recovering purified (meth)acrylic acid during the synthesis of (meth)acrylic acid. The document describes a step of purification of a compound during its process of synthesis and of heating of the distillation columns.

US 2003/028052 describes a process for absorbing and purifying acrylic acid. The process uses distillation columns.

Technical Problem

The aim of the invention is thus to overcome at least one of the abovementioned drawbacks of the prior art.

The invention is notably directed toward proposing a simple and efficient solution for isolating a mole fraction of interest from a gaseous effluent obtained from the thermal decomposition of a polymer or of a polymer blend, so as to recover one or more compounds (e.g. monomer(s)) of improved quality.

BRIEF DESCRIPTION OF THE INVENTION

To this end, one subject of the invention is a process for treating a gaseous effluent obtained from a pyrolytic decomposition of a polymer or of a polymer blend, for recovering one or more monomers contained in said gaseous effluent, said process being characterized in that it comprises the following steps:

- a condensation step which consists in injecting the gaseous effluent into a condensation chamber maintained at a first pressure $p_1$, and in placing it in contact with an absorbent liquid, the temperature of said absorbent liquid being below the temperature of the gaseous effluent, so that said monomer(s) condense(s) in the absorbent liquid by heat exchange,
- a step of partial vaporization of the condensate obtained on conclusion of the condensation step, by expansion of the condensate in a chamber maintained at a second pressure $p_2$ below the first pressure $p_1$,
- a reinjection step which consists in at least partly redirecting a first liquid or vapor fraction, obtained on conclusion of the partial vaporization step, to the condensation chamber to once again absorb the monomer(s) contained in the gaseous effluent; preferably, where appropriate, the vapor fraction is recondensed before it is introduced into the condensation chamber, and
- a recovery step including purification of a second liquid or vapor fraction, obtained on conclusion of the partial vaporization step and charged with monomer(s).

Thus, it has been discovered that condensation, using an absorption device for placing the gaseous effluent in contact with an absorbent liquid whose temperature is well below that of the effluent, followed by partial vaporization of the condensate obtained notably in the presence of a pressure differential, makes it possible to efficiently isolate the monomer(s) contained in the gaseous effluent obtained from the decomposition of one or more polymers.

According to Other Optional Features of the Process:

- during the reinjection step, the first fraction reinjected is a liquid fraction and during the recovery step, the second fraction recovered is a vapor fraction;
- the absorbent liquid is selected so that the ratio between its latent heat of vaporization $\Delta Hv$ in the standard state and its molar specific heat $Cp$ in the standard state is greater than that of the monomer(s) to be recovered;

the absorbent liquid is chosen from one of the following compounds: benzene, benzonitrile, a compound of formula R—COOH, and a compound of formula R—OH, in which R may be chosen from alkyls, the carbon number of which is between 1 and 5, a phenyl or a hydrogen;

the absorbent liquid is chosen so that its boiling point is of the order of magnitude of that of the monomer(s) to be recovered ±80° C., preferably ±50° C., more preferably ±30° C. and even more preferably ±10° C.;

the absorbent liquid has a boiling point above or substantially equal to that of the monomer(s) to be recovered and/or of the azeotrope which it forms with the monomer(s) to be recovered;

the polymer is selected from: polyethylenes such as high-density polyethylene (HDPE) or polyethylene terephthalate (PET); a homopolymer and copolymer of olefins such as acrylonitrile-butadiene-styrene copolymers, styrene-butadiene-alkyl methacrylate (or SBM) copolymers; polypropylene, polybutadiene and polybutylene; acrylic homopolymers and copolymers and polyalkyl methacrylates such as poly(methyl methacrylate); a polyhydroxyalkanoate; homopolyamides and copolyamides; polycarbonates; polyesters including poly(ethylene terephthalate) and poly(butylene terephthalate); polyethers such as poly(phenylene ether), poly(oxymethylene), poly(oxyethylene) or poly(ethylene glycol) and poly(oxypropylene); polystyrene; copolymers of styrene and maleic anhydride; poly(vinyl chloride); fluoropolymers such as poly(vinylidene fluoride), polyethylene tetrafluoride and polychlorotrifluoroethylene; natural or synthetic rubbers; thermoplastic polyurethanes; polyaryl ether ketones (PAEK) such as polyether ether ketone (PEEK) and polyether ketone ketone (PEKK); polyetherimide; polysulfone; poly(phenylene sulfide); cellulose acetate; poly(vinyl acetate); or a mixture of two or more of these polymers;

the monomer(s) are selected from the following compounds: methyl methacrylate, methyl acrylate, ethyl acrylate, acrylic acid, methacrylic acid, styrene, crotonic acid, gamma-butyrolactone, delta-valerolactone and mixtures thereof;

the injection of the gaseous effluent during the condensation step is performed co-currentwise or count-currentwise relative to the absorbent liquid;

the process also includes a separation step on the condensate obtained on conclusion of the condensation step before the partial vaporization step;

the process also includes a step of adjusting the temperature of the fraction redirected into the condensation chamber to once again absorb the monomer(s) contained in the gaseous effluent; this step may, for example, include heating or cooling;

at the moment of the condensation step, additives are added to the absorbent liquid, said additives possibly being chosen from polymerization inhibitors;

at the moment of the partial vaporization step, additives are added to the circuit, said additives possibly being chosen from polymerization inhibitors.

A subject of the invention is also a system for treating a gaseous effluent obtained from a pyrolytic decomposition of a polymer or of a polymer blend, for recovering one or more monomers contained in said gaseous effluent, said system being characterized in that it comprises:

a condensation chamber which can be maintained at a first pressure $p_1$, said chamber comprising, in its side wall, an inlet orifice for the gaseous effluent and an absorption device capable of enabling contact of said gaseous effluent with an absorbent liquid whose temperature is below that of the gaseous effluent, said chamber also comprising a gas outlet orifice at its upper end and an outlet orifice for the condensate obtained, in its lower part, a second chamber in fluid communication with the condensation chamber and intended to receive the liquid containing the condensate obtained on conclusion of the condensation step, said second chamber being able to be maintained at a second pressure $p_2$ below the first pressure $p_1$, so as to bring about expansion of the condensate and adiabatic partial vaporization thereof, a pump for recovering a liquid fraction obtained from the second chamber to reinject it into the first condensation chamber via the absorption device.

According to other optional features of the system:

it also comprises a heat exchanger, located downstream of the second chamber, for condensing the gaseous fraction obtained from the partial vaporization brought about by the expansion of the condensate in the second chamber, and a means for purifying the constituents of said condensed gaseous fraction;

it also comprises a separation device, located upstream of the second chamber, which is preferably capable of separating compounds by filtration, decantation, centrifugation or esterification;

it also comprises a heat exchanger upstream of the first chamber, which is capable of adjusting the temperature of, preferably of cooling, the liquid fraction obtained from the second chamber before it is injected into the first chamber;

it also comprises a purification device, located downstream of the second chamber, which is capable of purifying part of the liquid fraction obtained from the second chamber;

it also comprises an absorbent liquid injection point.

Other advantages and features of the invention will become apparent on reading the following description given by way of illustrative and nonlimiting example, with reference to the appended figures, which depict.

DETAILED DESCRIPTION OF THE INVENTION

In the remainder of the description, the term "monomer" means a molecule which can undergo polymerization. The term "monomer" means the most predominant monomer unit constituting a polymer. Thus, in PMMA, the monomer is methyl methacrylate (MMA) whereas it is styrene for polystyrene.

The term "polymerization" as used relates to the process for converting a monomer or a mixture of monomers into a polymer.

The term "depolymerization" as used relates to the process for converting a polymer into one or more monomers and/or oligomers and/or polymers of smaller molar mass than the initial polymer.

For the purposes of the invention, the term "pyrolytic decomposition" corresponds to a step of raising to very high temperature bringing about a transformation of a polymer into various compounds including monomers.

The term "polymer" means either a copolymer or a homopolymer. A "copolymer" is a polymer grouping together several different monomer units and a "homopolymer" is a polymer grouping together identical monomer units.

The term "thermoplastic polymer" means a polymer which, in a repeated manner, can be softened or melted under the action of heat and which takes on new shapes by application of heat and pressure. Examples of thermoplastics are, for example: polyethylene, a (meth)acrylic polymer such as poly(methyl methacrylate) (PMMA), or polystyrene (PS), polylactic acid (PLA), polyhydroxyalkanoates (PHA).

The term "(meth)acrylic polymer" means a homopolymer or a copolymer based on (meth)acrylic monomer, which is chosen, for example, from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and mixtures thereof. Poly(methyl methacrylate) (PMMA) is a particular example of a (methacrylic) polymer obtained by polymerization of a methyl methacrylate monomer. For the purposes of the invention, the term "PMMA" denotes homopolymers and copolymers of methyl methacrylate (MMA), the weight ratio of MMA in the PMMA preferably being at least 70% by weight for the MMA copolymer.

The term "copolymer based on methyl methacrylate" means a copolymer containing at least one methyl methacrylate monomer. For example, a copolymer based on methyl methacrylate may be a copolymer comprising at least 70%, preferably 80%, advantageously 90% by weight of MMA in the PMMA.

The term "light mole fraction" means the proportion of a component whose relative volatility, relative to the other components of a mixture, is the highest, the "medium mole fraction" means the proportion of a component whose relative volatility, relative to the other components of the mixture, is medium, and the "heavy mole fraction" means the proportion of a component whose relative volatility, relative to the other components of the mixture, is the lowest.

The term "latent heat of vaporization $\Delta Hv$ in the standard state" or "enthalpy of vaporization", expressed in $J \cdot mol^{-1}$, means the enthalpy variation accompanying the vaporization of one mole of a compound.

The term "molar specific heat in the standard state", expressed in $J \cdot mol^{-1} \cdot K^{-1}$, means the amount of heat to be supplied to one mole of a compound to raise its temperature by 1° C.

The term "condensation" means the change of state of a compound passing from a gaseous state to a liquid state. The term "vaporization" means the change of state of a compound passing from a liquid state to a gaseous state.

For the purposes of the invention, the term "condensate" means a mixture of compounds obtained on conclusion of a step of condensation of a gas. In the context of the invention, this mixture preferably comprises one or more monomers and an absorbent liquid which has participated, notably by heat exchange, in the condensation of the monomer(s). The condensate may also correspond to one or more monomers after a purification step. The gas to be condensed comprises at least 30% by mass, preferably at least 40% by mass and more preferably at least 50% by mass of the condensable matter.

For the purposes of the invention, the term "absorbent liquid" corresponds to a compound, in the liquid state at a temperature of 50° C. and a pressure of 1 bar absolute, which is capable of absorbing heat energy originating from the monomer(s) of the gaseous effluent.

The term "gaseous effluent" means a reaction product obtained from a thermal decomposition and including mole fractions which may notably comprise the monomer(s). The gas to be condensed comprises at least 30% by mass, preferably at least 40% by mass and more preferably at least 50% by mass of the condensable matter.

For the purposes of the invention, the term "heat exchange" means a system for transferring heat between a first element and a second element, the first element having a higher temperature than the second element, which brings about cooling of the first element and heating of the second. For the purposes of the invention, the term "placing in contact" means direct contact, i.e. heat exchange without a separating wall between the first and the second element.

For the purposes of the invention, the term "fluid communication" corresponds to the fact that two parts are arranged so as to allow the passage of a fluid from a first part to a second part without there being any leakage.

For the purposes of the invention, the term "substantially equal" means a value varying by less than 30% relative to the compared value, preferably by less than 20%, even more preferably by less than 10%.

In the rest of the description, the same reference numerals are used to denote the same elements.

According to one aspect, the invention relates to a process 200 for treating a gaseous effluent. The gaseous effluent generally originates from the pyrolytic decomposition of a polymer or a polymer blend. The polymer may be, for example, polyethylenes such as high-density polyethylene (HDPE) or polyethylene terephthalate (PET); polypropylene, polybutadiene and polybutylene, a homopolymer and copolymer of olefins such as acrylonitrile-butadiene-styrene copolymers, styrene-butadiene-alkyl methacrylate (or SBM) copolymers; acrylic homopolymers and copolymers and polyalkyl methacrylates such as poly(methyl methacrylate) (PMMA); a polyhydroxyalkanoate; homopolyamides and copolyamides; polycarbonates; polyesters including poly (ethylene terephthalate) and poly(butylene terephthalate); polyethers such as poly(phenylene ether), poly(oxymethylene), poly(oxyethylene) or poly(ethylene glycol) and poly (oxypropylene); polystyrene; copolymers of styrene and maleic anhydride; poly(vinyl chloride); fluoropolymers such as poly(vinylidene fluoride), polyethylene tetrafluoride and polychlorotrifluoroethylene; natural or synthetic rubbers; thermoplastic polyurethanes; polyaryl ether ketones (PAEK) such as polyether ether ketone (PEEK) and polyether ketone ketone (PEKK); polyetherimide; polysulfone; poly(phenylene sulfide); cellulose acetate; poly(vinyl acetate), polypropiolactone or a mixture of two or more of these polymers.

A PolyHydroxyAlkanoate (PHA) may be selected, for example, from: poly-3-hydroxybutyrate (P3HB), poly-4-hydroxybutyrate (P4HB), poly-3-hydroxypropionate (P3HP), poly-5-hydroxyvalerate (P5HV), poly-6-hydroxyhexanoate, polylactic acid (PLA), polyglycolic acid, poly-3-hydroxybutyrate-co-3-hydroxypropionate, poly-3-hydroxybutyrate-co-(D)-lactide, poly-3-hydroxybutyrate-co-4-hydroxybutyrate (poly-3HB-co-4HB), poly-3-hydroxybutyrate-co-3-hydroxyvalerate (poly-3-HB-co-3HV), poly-3-hydroxybutyrate-co-5-hydroxyvalerate and poly-3-hydroxybutyrate-co-3-hydroxyhexanoate which are essentially polymers naturally produced by microorganisms and which are formed by the polymerization of one or more monomers.

The monomer components of the PHAs comprise, without being limited thereto, the acid or ester forms such as acrylic acid, 3-hydroxybutyric acid, 3-hydroxybutyrate, 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxydodecanoate, 4-hydroxybutyrate, 4-hydroxyvalerate, 5-hydroxyvalerate, 6-hydroxyhexanoate, 2-methyl-3-hydroxypropanoate, 2-methyl-2-hydroxypropanoate, 2-hydroxypropanoate (lactic acid) and 2-hydroxyethanoate (glycolic acid); and/or the lactone or lactam forms such as caprolactone or caprolactam, or propiolactone, butyrolactone or valerolactone. Such monomer components may form homopolymers or copolymers. Although examples of PHA copolymers bearing two different monomer components have been provided, the PHA may bear more than two different monomer components. During the pyrolysis of the PHAs and PLAs, other monomer components may be formed and used as monomers, or as reagents in new syntheses.

Preferably, the polymer is selected from: polymethyl methacrylate (PMMA) a polyhydroxyalkanoate, PLA, polystyrene, copolymers of styrene and of anhydride, or a blend of two or more of these polymers.

In addition, the polymer may originate from a composite material including a polymer and a reinforcer.

Such a process makes it possible to recover one or more monomers contained in a gaseous effluent. The pyrolytic decomposition of a polymer does not systematically lead to the formation of monomer(s). Thus, other monomers which are just as advantageous to upgrade as a monomer may be formed during this decomposition. Thus, the product of interest may be a monomer or a mixture of monomers obtained from the decomposition of the polymer(s). The product of interest may in particular be a monomer or a mixture of monomers obtained from the decomposition of the polymer(s). Typically, at the end of the process, the user will have available a fraction enriched in monomers which he will be able, for example, to use as such, purify further or else transform.

The monomer(s) may, for example, be selected from the following compounds: methyl methacrylate, methyl acrylate, ethyl acrylate, acrylic acid, methacrylic acid, styrene, crotonic acid, gamma-butyrolactone, delta-valerolactone and mixtures thereof. Preferably, the monomer(s) are selected from the following compounds: methyl methacrylate, methacrylic acid, acrylic acid, styrene, and mixtures thereof.

Preferably, the gas to be treated is obtained from the thermal decomposition of a thermoplastic polymer and the product of interest to be recovered is the monomer of the decomposed polymer. The monomer thus recovered may then be recycled.

To do this, the process involves an absorbent liquid which may advantageously be reused in the context of a cyclic condensation system which will be detailed later.

The absorbent liquid is advantageously selected to optimally promote the heat exchanges with the gaseous effluent in the condensation chamber 110, on the one hand, and partial vaporization of the condensate during the expansion in the second chamber 130, on the other hand. Thus, the choice of the absorbent liquid is preferably adapted to the monomer(s) to be recovered. The monomer(s) to be recovered are liquid at an atmospheric pressure of 1013 mbar.

Preferably, the absorbent liquid is selected so that the ratio between its latent heat of vaporization $\Delta Hv$ in the standard state and its molar specific heat Cp in the standard state is as high as possible and, in all cases, greater than that of the monomer(s) to be recovered. Thus, the efficiency of the treatment process according to the invention is greatly improved. These standards state values of latent heat of vaporization and of molar specific heat can be found in the manuals known to those skilled in the art. They preferably correspond to the state at a pressure of 1 bar. The latent heat of vaporization $\Delta Hv$ in the standard state of the absorbent liquid is, for example, greater than or equal to 20 kJ/mol, preferably greater than or equal to 30 kJ/mol, more preferably greater than or equal to 40 kJ/mol and even more preferably greater than or equal to 50 kJ/mol.

Advantageously, the absorbent liquid is chosen from one of the following compounds: benzene, benzonitrile, a compound of formula R—OH, a compound of formula R—COOH, in which R may be chosen from alkyls, the carbon number of which is between 1 and 5, a phenyl or a hydrogen. Thus, the absorbent liquid may be selected, for example, from: benzene (71-43-2), benzonitrile (100-47-0), dihydrogen monoxide (7732-18-5), methanol (67-56-1), ethanol (64-17-5), propanol (71-23-8 or 67-63-0), butanol (71-36-3; 78-92-2; 15892-23-6; 14898-79-4; 4221-99-2), phenol (108-95-2), formic acid (64-18-6), acetic acid (64-19-7) or mixtures thereof.

In a first embodiment, more advantageously, for environmental and ecological reasons, the absorbent liquid is chosen from one of the following compounds: a compound of formula R—OH, a compound of formula R—COOH, in which R may be chosen from alkyls, the carbon number of which is between 1 and 5, or a hydrogen. Thus, the absorbent liquid may be selected, for example, from: dihydrogen monoxide (7732-18-5), methanol (67-56-1), ethanol (64-17-5), propanol (71-23-8 or 67-63-0), butanol (71-36-3; 78-92-2; 15892-23-6; 14898-79-4; 4221-99-2), formic acid (64-18-6), acetic acid (64-19-7) or mixtures thereof.

Preferably, the absorbent liquid is chosen such that its boiling point is of the order of magnitude of that of the monomer(s) to be recovered, i.e. so that it is not more than 80° C. and preferably 50° C. less or greater than the boiling point of the monomer(s) to be recovered. In this case, the formation of azeotropes between the absorbent liquid and the monomer(s) cannot be excluded. Preferably, the absorbent liquid has a boiling point above or substantially equal to that of the monomer(s) to be recovered and/or of the azeotrope which it forms with the monomer(s) to be recovered.

Figure 1:
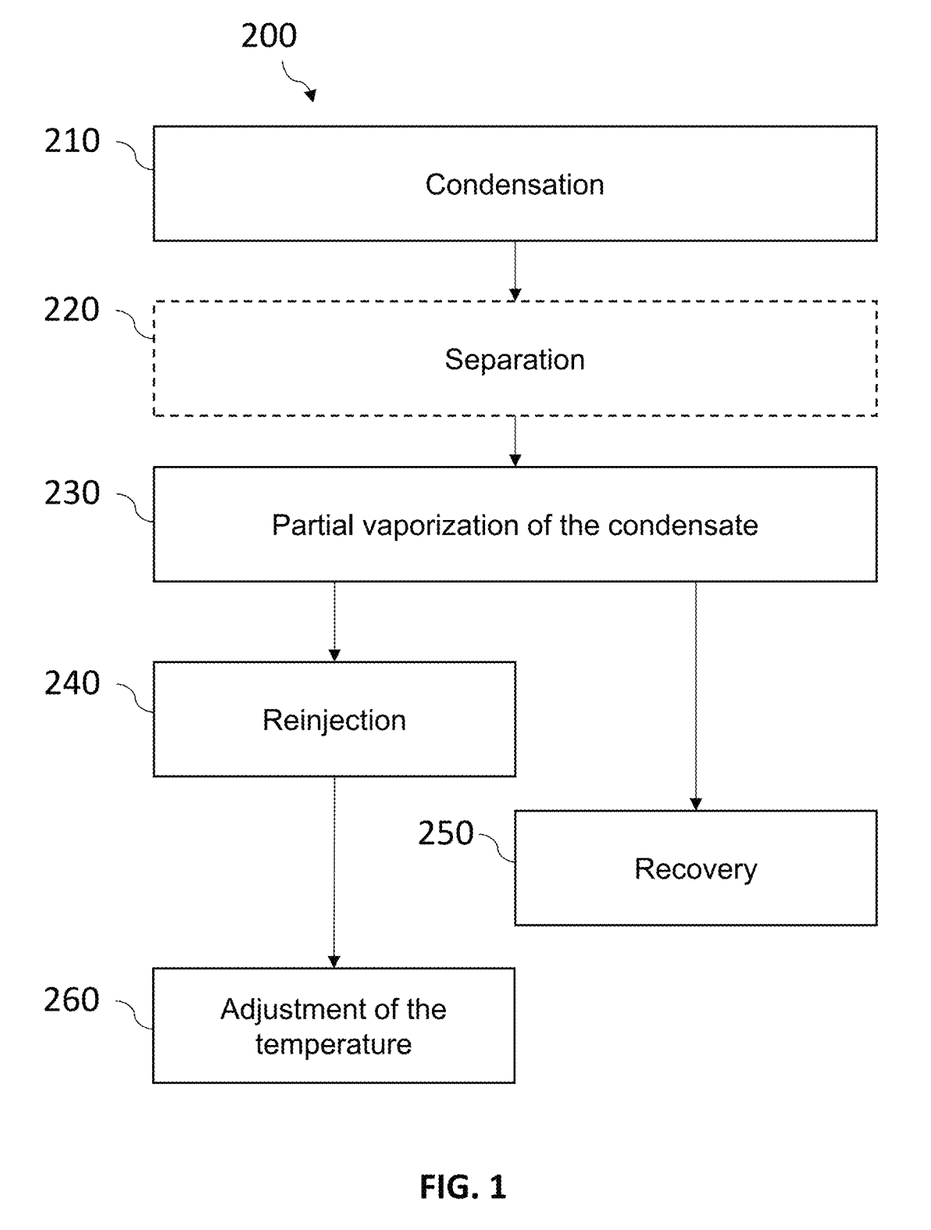
FIG. 1, a synoptic view of an example of a process according to the invention, FIG. 2, a synoptic scheme of an example of a system in accordance with the invention.

An example of a process according to the invention is illustrated in FIG. 1 and it will be detailed in connection with a system according to the invention as represented schematically in FIG. 2. As illustrated in FIG. 1, the process according to the invention involves a condensation step 210 including the injection of the gaseous effluent into a condensation chamber 110 maintained at a first pressure $p_1$. The condensation chamber 110 may be maintained, for example, at a pressure $p_1$ of between 0.1 and 5 bar, preferably between 0.5 and 2 bar, preferably between 0.8 and 1.5 bar and more preferably between 0.9 and 1.2 bar absolute.

The condensation step 210 also includes the placing in contact of the gaseous effluent with an absorbent liquid. The temperature of the absorbent liquid is below the temperature of the gaseous effluent, so that said monomer(s) condense on contact with the absorbent liquid. Preferably, the temperature of the absorbent liquid is at least 50° C. below the temperature of the gaseous effluent, more preferably at least 60° C. below and even more preferably at least 80° C. below. In addition, the temperature of the absorbent liquid is, for example, not more than 450° C. below the temperature of the gaseous effluent. Advantageously, the temperature of the absorbent liquid is at least 50° C. and not more than 450° C. below the temperature of the gaseous effluent, and more advantageously at least 60° C. and not more than 450° C. In particular, the absorbent liquid may have, at its inlet into the condensation chamber 110, a temperature of less than or equal to 140° C., preferably less than or equal to 120° C., more preferably less than or equal to 100° C. and even more preferably less than or equal to 80° C.

The placing in contact may be performed, for example, via a spraying column, micro-spraying, a bubble column, a packed column, a falling film, a plate column, a venturi effect (for example systems of Buss-Loop type), a centrifugal contact system of spinning disc type or of rotating packed bed (RPB) type also known as HiGee. In the centrifugal systems, the force of gravity obtained is used to force the liquid to pass through the equipment by generating a thin film, while the gas passes through the equipment in co-current or counter-current mode. The RPB/HiGee technology is notably suitable for promoting the gas-liquid contact of the invention.

Additives may optionally be added to the absorbent liquid during the condensation step 210. Thus, it is possible to add polymerization-inhibiting additives, such as hydroquinone, phenothiazine (PTZ), hydroquinone monomethyl ether (HQME) or other known products which limit radical polymerization reactions, thus making it possible to stabilize the gaseous effluent, once condensed, obtained from the polymer pyrolysis.

Advantageously, the process according to the invention may also include a step of controlling the acidity-basicity of the absorbent liquid and of regulating its pH by adjusting the flow rate of an acidic or basic solution so that the pH is between 4 and 9, preferably between 5 and 8. This controlling of the pH is particularly important when the pyrolysis reaction generates basic or acidic byproducts that might accumulate in the absorbent liquid and cause corrosion of the facilities. Advantageously, the controlling of the pH makes it possible to remove acids formed during the pyrolysis or to separate these acids from the other components according to their acidity constant.

For example, when plastics to be recycled contain PVC (polyvinyl chloride), pyrolysis thereof generates hydrochloric acid which can not only cause corrosion of the facilities but also gradually lower the pH of the absorbent liquid and thus accumulate in the condensation loop. Thus, the process according to the invention may comprise a step of injecting into the absorbent liquid a base such as a base selected from calcium oxide, sodium hydroxide, calcium hydroxide or potassium hydroxide, sodium or potassium methoxide, sodium, potassium or calcium hydrogen carbonate or carbonate.

In addition, during this condensation step 210, a light mole fraction which may be contained in the gaseous effluent obtained from the polymer pyrolysis may not be fully condensed by contact with the absorbent liquid. It may then be evacuated from the condensation chamber 110, in the gaseous state, via the outlet orifice 113 located at the upper end of the condensation chamber 110. Thus, the process according to the invention may also include a step of recovering an uncondensed light mole fraction and of placing it in contact with a heat exchanger. Specifically, this light fraction can be energetically upgraded to enable, for example, the depolymerization of the plastic residues.

In certain cases, the process according to the invention may involve a separation step 220 downstream of the condensation step 210. This separation step 220 may be intended to purify the condensate generated during the condensation step 210 before the partial vaporization step 230. This separation step 220 may, for example, involve filtration, decantation or centrifugation.

In addition, optionally, before being conveyed to the second chamber 130, the temperature of the condensate may be modified via an additional heat exchanger not shown in FIG. 1. For example, the process may also include a step of heating the condensate obtained on conclusion of the condensation step 210 before the partial vaporization step 230.

The process according to the invention also includes a step 230 of partial vaporization of the condensate obtained on conclusion of the condensation step 210. This partial vaporization is made possible by means of the implementation of expansion of the condensate in a second chamber 130 maintained at a pressure $p_2$ below the pressure $p_1$ of the first condensation chamber 110. The second chamber 130 may be maintained, for example, at a pressure $p_2$ of between 0.001 and 0.8 bar, preferably between 0.01 and 0.5 bar, preferably between 0.1 and 0.4 bar, limits inclusive.

Advantageously, the pressure difference $\Delta p_1$-$p_2$ as an absolute value between the first chamber 110 and the second chamber 130 is greater than or equal to 0.5 bar, preferably greater than or equal to 0.6 bar, more preferably greater than or equal to 0.7 bar and even more preferably greater than or equal to 0.8 bar. A temperature difference between the first chamber 110 and the second chamber 130 may be achieved by adjusting the pressure difference $\Delta p_1$-$p_2$ between these two chambers. Preferably, the temperature difference between the first chamber 110 and the second chamber 130 is substantially equal to 25° C. The temperature difference will advantageously be at least equal to 5° C. and less than or equal to 25° C. Such values make it possible to improve the performance of the treatment process.

As previously, optionally, additives may be added into the circuit at the moment of the partial vaporization step 230. The additives are, here also, preferably polymerization inhibitors.

The process according to the invention also includes a recovery step 250 including purification of a second liquid or vapor fraction charged with monomer(s), obtained on conclusion of the partial vaporization step 230.

Thus, if the second fraction charged with monomer(s) is a vapor fraction, then the recovery step 250 preferably involves condensation of the vapor fraction obtained on conclusion of the partial vaporization step 230. Alternatively, if the second fraction charged with monomer(s) is a liquid fraction, then the recovery step 250 may involve filtration or decantation of the liquid fraction obtained on conclusion of the partial vaporization step 230. Said condensation of the vapor fraction, and also said filtration or decantation of the liquid fraction, obtained on conclusion of the partial vaporization step 230 are considered as purifications in the recovery step 250.

In addition, in the case of formation of azeotropes, the process according to the invention includes an additional separation step. Specifically, in the presence of azeotropes, the constituent products of the azeotrope, i.e. in the present case the absorbent liquid and the monomer(s), will be separated via methods that are well known to those skilled in the art and the absorbent liquid may once again be used in the condensation step 210. This separation will consist, for example, in using two successive distillation columns maintained at different pressures, and/or liquid-liquid extractions or extractive distillations. This additional step advantageously makes it possible to isolate the monomer(s) that it is desired to recover and to recycle the absorbent liquid so as to return it into the condensation loop.

The recovery step may also comprise an injection of polymerization inhibitors so as to maintain a content of the order of 5 to 300 mg/kg in the monomer solution.

The process according to the invention also includes a reinjection step 240 which consists in at least partly redirecting a first liquid or vapor fraction, obtained on conclusion of the partial vaporization step 230, to the condensation chamber 110. This first fraction preferably predominantly includes absorbent liquid, in liquid or gaseous form following the partial vaporization step 230.

Thus, if the first fraction is a vapor fraction, then the reinjection step 240 preferably involves condensation of this vapor fraction obtained on conclusion of the partial vaporization step 230. Alternatively, if the first fraction is a liquid fraction, then the reinjection step 240 involves redirection, to the condensation chamber 110, of at least part of the liquid fraction obtained on conclusion of the partial vaporization step 230. In addition, the first fraction, in the form of a liquid fraction, may undergo a separation step making it possible to return a fraction enriched in absorbent liquid.

The fraction thus redirected may be used to once again absorb the monomer(s) contained in the gaseous effluent.

In particular, the process according to the invention may also include a step of adjusting the temperature 260 of the fraction redirected to the condensation chamber 110. Thus, this fraction, which in principle is liquid, may be heated or cooled before being once again introduced into the condensation chamber 110.

As has been discussed, the absorbent liquid may be contaminated with residues arising notably from pyrolytic decomposition of the polymer or of the polymer blend. Thus, before being reinjected via the absorption device 112, the absorbent liquid may undergo a purification step which may be performed by means of a purification device 150 or 170. This purification step may correspond, for example, to filtration, decantation, centrifugation, distillation, membrane separation, solvent extraction and/or condensation and any possible combination.

In addition, in connection with the optional steps of purification of the absorbent liquid, it is possible that the amount of absorbent liquid in the system decreases or that it is necessary to renew it. Preferably, the process according to the invention thus involves a step of injecting absorbent liquid into the system at an injection point 116. The injected absorbent liquid is at a temperature that is low enough for the temperature increase of the absorbent liquid to make it possible to absorb the heat of condensation of the monomer(s) without causing significant vaporization of the absorbent liquid. Moreover, the injection point 116 may also allow the injection of additives and notably polymerization inhibitors with the fresh absorbent liquid. Preferably, the process includes a step of injecting polymerization inhibitors so as to maintain a content of the order of 5 to 300 mg/kg of monomer(s) in the absorbent liquid, and preferably from 50 to 200 mg/kg of monomer(s).

In addition, notably in a context of recycling the absorbent liquid, the process according to the invention may include a step of analyzing the absorbent liquid. This analysis step may include, for example, measurement of the pH, of the conductivity and/or of the density. It may also include a gas chromatography analysis or the establishment of an infrared or Raman spectrum.

According to another aspect, the invention relates to a treatment system. The following description of the system according to the invention is given with regard to FIG. 2 which represents a scheme of the system according to one embodiment. Needless to say, the invention is not limited to this scheme, and the system may be performed in various possible variants without departing from the context of the invention.

The system 100 makes it possible to treat the gaseous effluents obtained from a pyrolytic decomposition of a polymer or of a polymer blend, so as to be able to recover a product of interest contained in these gaseous effluents.

The system 100 comprises a first chamber, also known as the condensation chamber or condensation stage hereinbelow and referenced 110. In the illustrated embodiment, this condensation chamber 110, which may be placed at a first pressure $p_1$, comprises an inlet orifice 111. The gaseous effluent which is still hot obtained from the thermal decomposition of the polymer(s) arrives via this inlet orifice 111 into the condensation chamber 110. The condensation chamber 110 is also equipped with an absorption device 112. This absorption device 112 makes it possible to inject an absorbent liquid into the chamber and thus allows contact between this absorbent liquid and the entering gaseous effluent. The absorption device 112 may be a liquid dispersion device as illustrated in FIG. 2, but may also consist of a packed column, a dispersion and liquid-gas contact system, etc. The temperature of the absorbent liquid is well below that of the gaseous effluent, and as such the monomer(s) contained in the gaseous effluent can condense in the absorbent liquid by heat exchange.

The cooling in the chamber 110 may take place counter-currentwise or co-currentwise. Thus, the absorption device 112 may correspond to a device for spraying the absorbent liquid located above the gaseous effluent inlet orifice and capable of scavenging the gaseous effluent. In this type of facility, a fog may form on account of the fine droplets of absorbent. This fog may then be entrained with the uncondensable gases and lead to a loss of absorbent and of product. The facility is then equipped with a fog-scavenging system (liquid/gas coalescer), which generally consists of packing, or a fine trellis which brings about coalescence of the droplets. This type of facility is well known to those skilled in the art.

The condensation chamber 110 may also include an outlet orifice 113 capable of enabling the evacuation of any light mole fraction, contained in the gaseous effluent obtained from the polymer pyrolysis, which has not been condensed by contact with the absorbent liquid. This light mole fraction may, for example, undergo a downstream treatment which may notably include condensation.

The liquid mixture condensed at a first pressure $p_1$, notably containing the monomer(s) and the absorbent liquid, also referred to as the condensate in the rest of the description, may be evacuated via an outlet orifice 114 preferably located in the base of the condensation chamber 110.

In one embodiment variant, when the condensate is in the form of a two-phase system, a device 120 for separation of the compounds by filtration, decantation or centrifugation, for example, may also be envisaged. In this case, a first absorbent liquid phase, essentially free of the monomer(s) which have condensed, is reinjected, by means of a pump, into the condensation stage 110 via the absorption system 112, just after the separation means 120, according to the dotted-line circuit in the scheme in FIG. 2, whereas the other absorbent liquid phase containing the compounds which have condensed is conveyed to the second chamber 130. This separation means then makes it possible to perform a first purification of the condensate. Thus, the separation means 120 is preferably arranged upstream of the second chamber 130. In one variant, the absorbent liquid separated by decantation may be purified, for example by isothermic adsorption, the impurities contained in the absorbent liquid being, for example, trapped on active charcoals, zeolite, ion-exchange resins or any other adsorption technique. The absorbent liquid is then recombined with the other absorbent liquid phase obtained from the decantation and sent to the unit 130.

Figure 2:
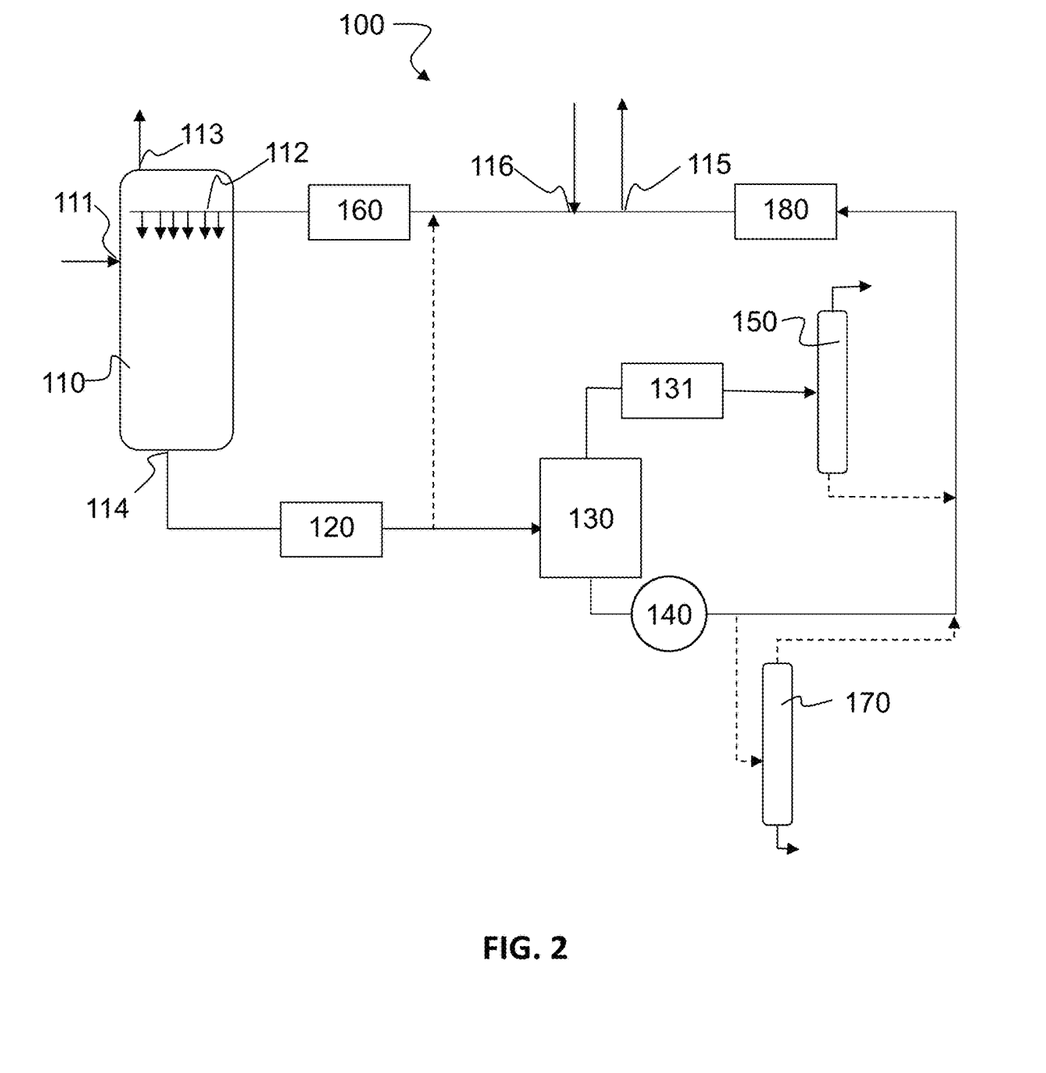

The separation device 120 illustrated in FIG. 2 may also be a device for filtration of the condensate making it possible to remove the dusts derived from the pyrolysis. Thus, the separation device 120 may advantageously be selected from: a filter such as a filter press, an active charcoal filter, a decanter or a centrifuge.

In addition, the separation device 120 may in certain cases be combined with an esterification reaction in order to improve the purification of the condensate. Notably in the case where the absorbent liquid is selected from alcohols or contains significant amounts of alcohols, and also organic acids, it may be advantageous to send this stream onto a bed of heterogeneous catalyst, or a homogeneous catalysis unit, functioning at a stable temperature. As heterogeneous catalyst that may be suitable for use in the system, use may be made of acidic resins such as Amberlyst® (e.g. Amberlyst A15, 35, 16, 36, 39, 46, 70, 131), supported enzymatic catalysts, and other solid acid catalysts. In the presence of a large amount of alcohol, the esterification reaction of the organic acids is favored by an equilibrium shift, and water is produced stoichiometrically relative to the amount of acid converted. The esterification reactions are generally sparingly endothermic or exothermic. The temperature of the condensate is thus maintained.

The system 100 according to the invention includes a second chamber 130 toward which may then be conveyed the condensate which has or has not undergone a prior separation. This second chamber 130 is capable of being maintained at a second pressure $p_2$ below the first pressure $p_1$. The condensate arriving in this second chamber 130 is then expanded, which brings about adiabatic partial vaporization of the condensate.

The second chamber 130 for expanding the condensate and for entraining partial adiabatic vaporization of the condensate may be, for example, in the form of a thin-film evaporator, for instance the evaporator sold by the company UIC GmbH or by the company VTA Verfahrenstechnische Anlagen GmbH & Co either as a scraped-film evaporator or as a short-path evaporator or else in the form of a vortex-effect cylinder in which the condensate is injected tangentially to the wall to bring about rotation of the fluid and a vortex effect which creates a depression at its center, the product then being withdrawn in the bottom part (sold by the company Penn Separator). It is also possible to use equipment in the form of a tank equipped with a diffuser in its central part, which disperses the stream in the volume, a packing/fog trap (mist eliminator/coalescer) at the top of the volume to coalesce the droplets present in the vapor fraction, a gas outlet at its top point and a liquid outlet at its bottom point. This type of equipment is well known to those skilled in the art and is described, for example, in Techniques de l'Ingénieur [Engineering Techniques], namely the documents Évaporation dans le traitement des effluents liquides [Evaporation in the treatment of liquid effluents], W 2 750, written by Bernard GALLICHER and Olivier SAVEL and Evaporation [Evaporation], J2320 V1, written by René LELEU.

The second chamber 130 is provided with at least two outlet orifices, a first orifice for evacuating the vapor fraction obtained from the partial vaporization and a second orifice for evacuating the non-evaporated liquid fraction.

As a function of the monomer/absorbent liquid combinations selected, the monomer(s), preferably the monomer(s) obtained from the decomposition of the polymer(s), will be predominantly contained in the vapor fraction or in the liquid fraction. Specifically, if the absorbent liquid is chosen so that its boiling point is markedly higher than that of the monomer(s) to be recovered, then it is probable that the monomer(s) obtained from the decomposition of the polymer(s) will be predominantly contained in the vapor fraction.

Preferably, the vapor fraction comprises a medium mole fraction of the gaseous effluent, the light mole fraction having already been evacuated in the condensation chamber and the heavy mole fraction remaining absorbed in the absorbent liquid. Advantageously, the vapor fraction comprises the monomer(s), preferably the base monomer(s), obtained from the decomposition of the polymer(s). This vapor fraction may then be conveyed to a heat exchanger 131 in order to be condensed, and then to a purification device 150, for instance a distillation column, in order to be purified. This monomer-rich fraction can then be upgraded.

When the liquid fraction includes a majority of absorbent liquid, it is at least partly redirected to the condensation chamber 110 where it once again absorbs the base monomer(s) by heat exchange. The absorbent liquid thus circulates in a loop in the system 100. To do this, a pump 140 located downstream of the outlet of the second chamber 130 makes it possible to recover this liquid fraction and to convey it to the condensation stage. Thus, the system 100 may also be referred to as a "condensation loop".

Nevertheless, as has been mentioned, the absorbent liquid may become charged with contaminants. In this context, the system advantageously includes a purification device 170 which is capable of purifying, for example regularly, part of the fraction including a majority of the absorbent liquid obtained from the second chamber 130 after expansion of the condensate. Preferably, the fraction including a majority of the absorbent liquid is the liquid fraction, as illustrated in FIG. 2. The purification device 170 may be selected, for example, from: a distillation unit, a membrane, a decanter, an extraction means, an adsorption unit, an ion-exchange resin. The purification device 170 makes it possible to free the absorbent liquid of the impurities gradually accumulated as the absorbent liquid passes in a loop in the condensation chamber 110.

In addition, as illustrated in FIG. 2, the system 100 according to the invention may include a device 180 for analyzing the absorbent liquid. Specifically, it should be checked whether the absorbent liquid that will be reinjected meets predetermined quality criteria. The analytical device may be selected, for example, from: infrared spectrometer, Raman analysis, a gas chromatography system, a conductimeter, a thermometer or a pH meter.

In this context, the system may advantageously include a purge point 115 which is capable of removing, preferably regularly, absorbent liquid and an injection point 116 which is capable of reinjecting, preferably regularly, absorbent liquid so that the process can be performed with an absorbent liquid which is not saturated with impurities and which can always absorb the monomer(s) to be recovered.

In addition, the system 100 according to the invention may preferably include an intermediate heat exchanger 160 located between the outlet of the second chamber 130 and the absorption device 112 of the first condensation chamber 110. Such a heat exchanger 160 may make it possible to further cool the liquid fraction originating from the second chamber 130 or to cool the absorbent liquid during the start-up phases of the system. Thus, it may be useful for certain absorbent liquids that are not sufficiently cooled during step 130.

EXAMPLES

The following examples nonlimitingly illustrate the scope of the invention.

Example 1: Treatment of a PHA Depolymerization Stream with an Absorbent Liquid Rich in Benzene and Methanol The stream obtained from a P3HP (Poly-3-Hydroxy-Propanoate) depolymerization unit is notably composed of acrylic acid (AA), water ($H_2O$) light gas, heavy compounds and solid dusts.

The total gas stream is 21.8 kg/h, consisting notably of 20 kg/h of AA, 0.10 kg/h of water, light compounds and heavy compounds. This stream is sent to a column or condensation chamber operated at 98 kPa. The gaseous effluent is injected at the bottom of the column at a temperature of 260° C. In the column, this stream is placed in contact with the absorbent liquid stream by means of a shower spray system. At the top of the column, the light gases are washed counter-currentwise with condensates produced by the cooling of these light gases, and also with a supply of 10 kg/h of methanol, 20 kg/h of benzene also containing a supply of phenothiazine.

At the bottom of the column, the condensate is at 65° C., the composition of the stream of 367 kg/h corresponds to 38 kg/h of methyl acrylate (MA), 20 kg/h of AA, 140 kg of MeOH ($\Delta Hv°=32.8$ kJ/mol, $Cp°$ L=81.1 J/mol/K), 150 kg/h of benzene ($\Delta Hv°=33.8$ kJ/mol, $Cp°$ L=136.0 J/mol/K), 8 kg/h of water. The stream contains about 10 ppm (i.e. 4 g/h) of phenothiazine. The stream is sent to a filter press so as to remove the dusts entrained during the depolymerization.

The liquid stream is then sent to an esterification reactor filled with Amberlyst A36 acidic resin. The reactor is operated as an ascending stream. The esterification reaction of the acrylic acid present is facilitated by the large excess of methanol. At the reaction outlet, the stream containing 63 kg/h of MA and 13 kg/h of water is sent into a second chamber, or evaporator, enabling partial vaporization, operated at 10 kPa. The evaporator is in the form of a vertical cylinder equipped with a diffuser at its base, the role of which is to spray the liquid in the chamber, a mist eliminator at the top, the role of which is to coalesce the droplets forming a fog in the chamber so as to return into the chamber the heavy product which would have been entrained with the vaporization gases.

A light gas fraction containing a stream rich in methanol and MA ($\Delta Hv°=29.2$ kJ/mol, $Cp°$ L=158.8 J/mol/K) is produced. The fraction that is liquid at 35° C. is then heated to 65° C. and injected into another adiabatic evaporator, operated under the same conditions as the preceding one. The two light streams obtained from the evaporators are combined, cooled and redistilled so as to separate the methanol from the MA and the benzene. The methanol and benzene thus recovered, still containing a fraction of MA, are sent to the absorption unit with a supplement of fresh methanol. The purified MA recovered is stabilized with 200 mg/kg of HQME (hydroquinone monomethyl ether).

The heavy fraction from the second chamber is at 35° C. This heavy fraction contains about 13 kg/h of water, 39 kg/h of MA, 120 kg/h of methanol, 130 kg/h of benzene and also heavy compounds. This heavy fraction contains "heavy" impurities which are partly removed by adsorption on silica. The rest of the heavy fraction is returned to the condensation column.

Example 2: Treatment of a Polypropiolactone Depolymerization Stream with an Absorbent Liquid Rich in Xylene The gaseous effluent obtained from a polypropiolactone depolymerization unit as a 22.7 kg/h stream is notably composed of 20 kg/h of AA, 1 kg/h of water, light compounds and heavy compounds. This stream is sent to an absorption column (acting as a condensation chamber) operated at 98 kPa. The gaseous effluent is injected at the bottom of the column at a temperature of 280° C. In the column, this stream is placed in contact with the absorbent liquid by means of a shower spray system. At the top of the column, the light gases are washed counter-currentwise with condensates produced by the cooling of these light gases, and also with a supply of 10 kg/h of xylene, and also a supply of phenothiazine.

At the bottom of the column, the condensate is at 85° C., the composition of the stream of about 300 kg/h corresponds to 38 kg/h of acrylic acid ($\Delta Hv°=53.1$ kJ/mol, $Cp°$ L=145.7 J/mol/K), 250 kg/h of xylene=44.2 kJ/mol, $Cp°$ L=181.5 J/mol/K), 5.7 kg/h of water. The stream contains about 10 ppm (i.e. 4 g/h) of phenothiazine. The stream is sent to a filter so as to remove the dusts entrained during the depolymerization.

The stream is then sent to an adiabatic evaporator operated at 10 kPa.

A light fraction containing a stream rich in acrylic acid and xylene is produced. The stream is then purified and the xylene is returned to the absorption column.

The heavy fraction from the adiabatic evaporator is at 50° C. This heavy fraction contains about 19 kg/h of AA, 240 kg/h of xylene, 5 kg/h of water and also heavy compounds. This heavy fraction contains "heavy" impurities which are partly removed by purging to deconcentrate the loop.

Example 3: Treatment of a PMMA Depolymerization Stream with an Absorbent Liquid Rich in Methanol The gaseous effluent obtained from a PMMA depolymerization unit is notably composed of methyl methacrylate (MMA), methacrylic acid (MAA), methanol (MeOH), water ($H_2O$) light gas, heavy compounds and solid dusts.

The total stream of gaseous effluent of 30.5 kg/h notably consists of 14 kg/h of MMA, 0.50 kg/h of water, 0.9 kg of MeOH and 12 kg/h of MAA. This stream is sent to a condensation chamber absorption column operated at 98 kPa. The gaseous effluent is injected at the bottom of the column at a temperature of 425° C. In the column, this gaseous effluent is placed in contact with the absorbent liquid stream by means of a shower spray system. At the top of the column, the light gases are washed counter-currentwise with condensates produced by the cooling of these light gases, and also with a supply of 57 kg/h of methanol, 10 kg/h of MMA also containing a supply of phenothiazine.

At the bottom of the column, the condensate is at 65° C., the composition of the stream of 374 kg/h corresponds to 79 kg/h of MMA=40.1 kJ/mol, $Cp°$ L=191.2 J/mol/K), 8.6 kg/h of MAA, 257 kg of MeOH, 13 kg/h of water. The stream contains about 20 ppm (i.e. 8 g/h) of phenothiazine. The stream is sent to a filter press so as to remove the dusts entrained during the depolymerization.

The stream is then sent to an esterification reactor filled with Amberlyst A36 acidic resin. The reactor is operated as an ascending stream. The esterification reaction of the methacrylic acid present is facilitated by the large excess of methanol present. At the reaction outlet, the stream containing 97 kg/h of MMA and 15.5 kg/h of water is sent into a second chamber, an adiabatic evaporator, operated at 10 kPa.

A light fraction containing a stream rich in methanol and MMA is produced, including the MMA-methanol azeotrope (about 82% by weight of methanol, 64.2° C.). The fraction that is liquid at 35° C. is then heated to 65° C. and injected into another adiabatic evaporator, operated under the same conditions as the preceding one. The two light streams obtained from the evaporators are combined, cooled and redistilled so as to separate the methanol from the MMA. The methanol thus recovered, still containing a fraction of MMA, is sent to the absorption unit with a supplement of fresh methanol.

The heavy fraction from the second chamber is at 35° C. This heavy fraction contains 11 kg/h of water, 69 kg/h of MMA, and also heavy compounds and 196 kg/h of methanol. This heavy fraction contains "heavy" impurities which are partly removed by adsorption on silica.

Example 4: Treatment of a PMMA Depolymerization Stream

The stream obtained from a PMMA depolymerization unit is notably composed of methyl methacrylate (MMA), methacrylic acid (MAA), methanol (MeOH), water ($H_2O$) light gas, heavy compounds and solid dusts.

The gaseous effluent is in a total stream of about 22.4 kg/h notably including 20.7 kg/h of MMA, 0.08 kg/h of water, 0.33 kg of MeOH and 0.9 kg/h of MAA. This stream is sent to a condensation column operated at 98 kPa. The gaseous effluent is injected at the bottom of the column at a temperature of 475° C. In the column, this stream is placed in contact with the absorbent liquid stream by means of a shower spray system. At the top of the column, the light gases are washed counter-currentwise with condensates produced by the cooling of these light gases, and also with a supply of 0.3 kg/h water.

At the bottom of the column, the condensate is at 65° C., the composition of the stream of 403 kg/h corresponds to 330 kg/h of MMA, 10 kg/h of MAA, 3.2 kg of MeOH, 59 kg/h of dihydrogen monoxide. The stream is sent to a filter press so as to remove the dusts entrained during the depolymerization. The stream is then sent to a second chamber, such as an adiabatic evaporator, operated at 20 kPa. At the outlet, a light fraction contains a stream of 34.4 kg rich in MMA. This gas fraction is then further cooled to 35° C., and separated by decantation. A stream rich in MMA is then isolated. The other fraction is returned to the absorption column.

The heavy fraction from the second chamber is at 45° C. This heavy fraction contains MAA, 54 kg/h of dihydrogen monoxide, 301 kg/h of MMA, and also heavy compounds and methanol. The stream is sent to a bed of anionic resin to trap the MAA fed as an ascending stream. The resin is periodically regenerated. The exiting stream is sent to the condensation column.

Example 5: Treatment of a PMMA Depolymerization Stream

The gaseous effluent, in a total stream of 20.8 kg/h, notably consists of 20 kg/h of MMA, 0.03 kg/h of water, 0.07 kg of MeOH and 0.18 kg/h of MAA. This gaseous effluent is sent to a condensation chamber (or absorption column) operated at 98 kPa. The gaseous effluent is injected at the bottom of the column at a temperature of 420° C. In the column, this stream is placed in contact with the absorbent liquid stream (dihydrogen monoxide) by means of a shower spray system. At the top of the column, the light gases are washed counter-currentwise with condensates produced by the cooling of these light gases, and also with a supply of 1.5 kg/h of methanol, 3 kg/h of dihydrogen monoxide and also a supply of phenothiazine.

At the bottom of the column, the condensate is at 65° C., the composition of the stream of 294 kg/h corresponds to 112 kg/h of MMA, 8.1 kg/h of MAA, 1.4 kg of MeOH, 153 kg/h of dihydrogen monoxide. The stream contains about 38 ppm (i.e. 11 g/h) of phenothiazine. The stream is sent to a filter press so as to remove the dusts entrained during the depolymerization.

The pH of the condensate is controlled by adding sodium methoxide upstream into the absorbent liquid stream at about 0.1 kg/h.

The stream is then sent to an adiabatic evaporator operated at 20 kPa.

A light fraction of 25.2 kg/h containing a stream rich in MMA is produced. It is stabilized with 200 mg/kg of HQME. The MMA thus recovered has a purity of greater than 98%, and the two main impurities are methyl isobutyrate (0.6% by weight) and ethyl acrylate (0.3%). The product obtained may be further purified by an additional distillation.

The heavy fraction from the adiabatic evaporator is at 45° C. This heavy fraction contains 150 kg/h of dihydrogen monoxide, 92 kg/h of MMA, and also heavy compounds and methacrylic acid in sodium salt form.

Purging of this heavy fraction is performed before sending it to the condensation chamber so as to deconcentrate it in heavy compounds and methacrylic acid.

Example 6: Treatment of a Stream of Vapors Obtained from Polystyrene Pyrolysis The condensation chamber treats 20 kg/h of gaseous effluent at 470° C. coming from a pyrolysis unit. The absorbent liquid includes benzene, but may also contain organic compounds obtained from the gaseous effluent. The benzene content is maintained at 22% by mass. The flow rate of absorbent liquid imposed to enable cooling is of the order of 1000 kg/h and the temperature is 69° C. The major products are 647 kg of styrene (monomer), 212.5 kg of benzene, 23.2 kg of toluene, 70 kg of trimethylbenzene (TMB) and the remainder consisting of heavy products.

The light fractions leaving the condensation chamber via outlet 113 are partially condensed and the liquid may be added to the absorbent liquid stream.

The heavy fraction obtained from the partial vaporization in a second chamber such as an adiabatic evaporator is pumped, purified so as to remove the heavy products and used again in the condensation chamber. A portion of TMB solvent and the heaviest products such as phenanthrene are removed for a total of about 1.8 kg/h.

The light fraction obtained from the partial vaporization in the second chamber is of the order of 50 kg/h. It is partially condensed, and then purified so as to generate a benzene-rich phase used again in the condensation chamber. 32.4 kg/h of 95% benzene-rich phase are thus produced, and are recycled.

The non-recycled product, representing 17.8 kg/h, is a partially purified mixture predominantly including styrene.

Example 7: Treatment of a PHA Depolymerization Stream, Obtained by Fermentation

The stream obtained from a P3HP (Poly-3-Hydroxy-Propanoate) depolymerization unit is notably composed of acrylic acid (AA), water ($H_2O$) light gas and heavy compounds.

The total gas stream is 23.5 kg/h consists notably of 20 kg/h of AA, 0.33 kg/h of acetic acid, 0.10 kg/h of water, light compounds (0.28 kg/h) and heavy compounds (2.8 kg/h) consisting essentially of oligomers. This stream is sent to a column or condensation chamber operated at 110 kPa. The gaseous effluent is injected at the bottom of the column at a temperature of 250° C. In the column, this stream is placed in contact with the absorbent liquid stream by means of a shower spray system. At the top of the column, the light gases are washed counter-currentwise with condensates produced by the cooling of these light gases. The majority of the light gases produced on pyrolysis are removed in this condensation step, by keeping the absorption stream at a sufficiently high temperature.

At the bottom of the column, the condensate is at 85° C., the composition of the stream of 260 kg/h corresponds to 212 kg/h of acrylic acid, 2.7 kg/h of acetic acid ($\Delta Hv°$=52.1 kJ/mol, $Cp°$ L=123.3 J/mol/K), 0.15 kg/h of water and 45 kg/h of heavy compounds. The stream contains about 10 ppm of phenothiazine. The stream is sent to a filter press so as to remove the dusts entrained during the depolymerization.

The liquid stream is then sent to a second chamber, or evaporator, enabling partial vaporization, operated at 10 kPa. The evaporator is in the form of a vertical cylinder equipped with a diffuser at its base, the role of which is to spray the liquid in the chamber, a mist eliminator at the top, the role of which is to coalesce the droplets forming a fog in the chamber so as to return into the chamber the heavy product which would have been entrained with the vaporization gases.

A light gas fraction containing a stream rich in acrylic acid is produced. The acrylic acid (19 kg/h) recovered is stabilized with 200 mg/kg of HQME (hydroquinone monomethyl ether).

The heavy fraction from the second chamber is at 55° C. This heavy fraction contains about 190 kg/h of acrylic acid, 2.5 kg/h of acetic acid, and also heavy compounds (45 kg/h). This heavy fraction contains "heavy" impurities which are essentially acrylic acid oligomers. Withdrawal of about 6% of the heavy fraction is performed, so as to deconcentrate the heavy products from the loop. The effluent rich in acrylic acid and oligomers is returned to the PHA pyrolysis reactor so as to complete the depolymerization. The rest of the heavy fraction, stabilized with a supplement of phenothiazine, is returned to the condensation column.

The invention claimed is:

1. A process for treating a gaseous effluent obtained from a pyrolytic decomposition of a polymer or of a polymer blend, for recovering one or more monomers contained in said gaseous effluent, said process comprising the following steps:
   a condensation step which consists in injecting the gaseous effluent into a condensation chamber maintained at a first pressure $p_1$, and in placing the gaseous effluent in contact with an absorbent liquid, the temperature of said absorbent liquid being below the temperature of the gaseous effluent, so that said monomer(s) condense(s) in the absorbent liquid by heat exchange,
   a step of partial vaporization of a condensate obtained on conclusion of the condensation step, by expansion of the condensate in a second chamber maintained at a second pressure $p_2$ below the first pressure $p_1$,
   a reinjection step which consists in at least partly redirecting a first liquid or vapor fraction, obtained on conclusion of the partial vaporization step, to the condensation chamber to once again absorb the monomer(s) contained in the gaseous effluent, and
   a recovery step including purification of a second liquid or vapor fraction, obtained on conclusion of the partial vaporization step and charged with the monomer(s).

2. The process as claimed in claim 1, wherein the first pressure $p_1$ is between 0.1 and 5 bar.

3. The process as claimed in claim 1, wherein the temperature of the absorbent liquid is at least 50° C. below the temperature of the gaseous effluent.

4. The process as claimed in claim 1, wherein the temperature of the absorbent liquid is not more than 450° C. below the temperature of the gaseous effluent.

5. The process as claimed in claim 1, wherein the temperature of the absorbent liquid is at least 50° C. and not more than 450° C. below the temperature of the gaseous effluent.

6. The process as claimed in claim 1, wherein the second chamber is maintained at a pressure $p_2$ of between 0.001 and 0.8 bar.

7. The process as claimed in claim 1, wherein the pressure difference as an absolute value between the condensation chamber and the second chamber is greater than or equal to 0.5 bar.

8. The process as claimed in claim 1, wherein the recovery step includes condensation of the vapor fraction obtained on conclusion of the partial vaporization step if the second fraction charged with the monomer(s) is a vapor fraction.

9. The process as claimed in claim 1, wherein the recovery step includes filtration or decantation of the liquid fraction obtained on conclusion of the partial vaporization step if the second fraction charged with the monomer(s) is a liquid fraction.

10. The process as claimed in claim 1, wherein during the reinjection step, the first fraction reinjected is a liquid fraction and during the recovery step, the second fraction recovered is a vapor fraction.

11. The process as claimed in claim 1, wherein the absorbent liquid is selected so that the ratio between the absorbent liquid's latent heat of vaporization $\Delta Hv$ in the standard state and the absorbent liquid's molar specific heat $Cp$ in the standard state is greater than that of the monomer(s) to be recovered.

12. The process as claimed in claim 1, wherein the absorbent liquid is chosen from one of the following compounds: benzene, benzonitrile, a compound of formula R—COOH, and a compound of formula R—OH, in which R is chosen from alkyls, the carbon number of which is between 1 and 5, a phenyl or a hydrogen.

13. The process as claimed in claim 1, wherein the absorbent liquid is chosen from one of the following compounds: a compound of formula R—OH, a compound of formula R—COOH, in which R is chosen from alkyls, the carbon number of which is between 1 and 5, or a hydrogen.

14. The process as claimed in claim 1, wherein the absorbent liquid is chosen from dihydrogen monoxide, methanol, ethanol, propanol, butanol, formic acid, acetic acid or mixtures thereof.

15. The process as claimed in claim 1, wherein the absorbent liquid is chosen so that the absorbent liquid's boiling point is of the order of magnitude of that of the monomer(s) to be recovered ±80° C.

16. The process as claimed in claim 15, wherein the absorbent liquid has a boiling point above or substantially equal to that of the monomer(s) to be recovered and/or of an azeotrope formed with the monomer(s) to be recovered.

17. The process as claimed in claim 1, wherein the polymer is selected from: polyethylene; a homopolymer and copolymer of olefins; polypropylene, polybutadiene and polybutylene; acrylic homopolymers and copolymers and polyalkyl methacrylates; a polyhydroxyalkanoate; homopolyamides and copolyamides; polycarbonates; polyesters; polyethers; polystyrene; copolymers of styrene and maleic anhydride; poly (vinyl chloride); fluoropolymers; natural or synthetic rubbers; thermoplastic polyurethanes; polyaryl ether ketones (PAEK); polyetherimide; polysulfone; poly (phenylene sulfide); cellulose acetate; poly (vinyl acetate); polypropiolactone or a mixture of two or more of these polymers.

18. The process as claimed in claim 1, wherein the monomer(s) are selected from the following compounds: methyl methacrylate, methyl acrylate, ethyl acrylate, acrylic acid, methacrylic acid, styrene, crotonic acid, gamma-butyrolactone, delta-valerolactone and mixtures thereof.

19. The process as claimed in claim 1, wherein the injection of the gaseous effluent during the condensation step is performed co-currentwise or count-currentwise relative to the absorbent liquid.

20. The process as claimed in claim 1, wherein the process also includes a separation step on the condensate obtained on conclusion of the condensation step before the partial vaporization step.

21. The process as claimed in claim 1, wherein the process also includes a step of adjusting the temperature of the fraction redirected to the condensation chamber to once again absorb the monomer(s) contained in the gaseous effluent.

22. The process as claimed in claim 1, wherein at the moment of the condensation step, additives are added to the absorbent liquid.

23. The process as claimed in claim 1, wherein at the moment of the partial vaporization step (230), additives are added to the circuit.

* * * * *